United States Patent [19]

Vaidya

[11] 4,248,764
[45] Feb. 3, 1981

[54] COLORABLE, PEROXIDE CURABLE CHLORINATED POLYMER

[75] Inventor: Upen I. Vaidya, Newark, Del.

[73] Assignee: E. I. Du Pont de Nemours and Company, Wilmington, Del.

[21] Appl. No.: 4,916

[22] Filed: Jan. 19, 1979

[51] Int. Cl.$^3$ .............................................. C08K 5/36
[52] U.S. Cl. .............................. 260/42.33; 260/42.34; 260/42.44; 260/45.85 B; 260/45.85 S; 260/45.75 V
[58] Field of Search ................ 260/45.85 B, 45.85 S, 260/42.34, 42.44, 45.75 V, 42.33; 526/17, 31, 41

[56] References Cited

U.S. PATENT DOCUMENTS

| | | | |
|---|---|---|---|
| 3,235,532 | 2/1966 | Hopper et al. | 260/45.95 |
| 3,285,855 | 11/1966 | Dexter et al. | 260/45.85 B |
| 3,441,575 | 4/1969 | Dexter et al. | 260/45.95 |
| 3,629,363 | 12/1971 | Breda | 260/45.95 H |
| 3,801,517 | 4/1974 | Richwine | 260/2 A |

OTHER PUBLICATIONS

ACS Div., Polymer Chemistry—Polymer Preprints, Mar. 1971, vol. 12, No. 1, Stapfer, pp. 795–803.
Rubber World—Jan. 1951, Ratti, pp. 451–454.
Colorable Peroxide Cured Hypalon, by Vergas dated Aug. 10, 1976.

*Primary Examiner*—V. P. Hoke

[57] ABSTRACT

Heat resistant, curable, chlorinated polyethylene or chlorosulfonated polyethylene containing from about 25–45 weight percent chlorine and having incorporated therein the antioxidants thiodiethylene bis[3,5-di-t-butyl-4-hydroxy hydrocinnamate] and a dialkylthiodipropionate, and an organic peroxide curing agent.

12 Claims, No Drawings

COLORABLE, PEROXIDE CURABLE CHLORINATED POLYMER

BACKGROUND OF THE INVENTION

This invention is directed to a heat-resistant peroxide curable chlorosulfonated polyethylene or chlorinated polyethylene composition.

Both chlorosulfonated polyethylene and chlorinated polyethylene have been found to be especially useful as wire and cable coverings because of their resistance to ozone, oxidizing chemicals, heat and light. When these elastomers are used for wire and cable covering, generally, they are vulcanized by means of a conventional metal oxide-sulfur (or a compound that releases sulfur upon heating) curing system. A sulfur cure is used because sulfur imparts stable electrical properties to the elastomer. However, sulfur curing systems cause discoloration of the chlorinated polyethylene elastomer and, therefore, it has not been possible to obtain with a sulfur curing system an elastomer for wire covering that can be readily color coded for identification. The present invention provides a heat-stable, peroxide curable elastomeric composition that can be colored for identification.

SUMMARY OF THE INVENTION

It has been discovered that when a combination of antioxidants is compounded with chlorosulfonated polyethylene or chlorinated polyethylene, optionally containing other compounding ingredients, the chlorinated polymers are peroxide curable and, quite unexpectedly, they are heat resistant for surprisingly long times while, at the same time, the elastomers can be color coded. More specifically, the heat-resistant, curable, chlorinated polymer composition capable of being colored is chlorosulfonated polyethylene or chlorinated polyethylene containing from about 25–45 weight percent chlorine and having incorporated therein the antioxidants thiodiethylene bis[3,5-di-t-butyl-4-hydroxy hydrocinnamate] and a dialkylthiodipropionate of the formula

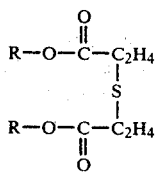

where R is an alkyl radical of 6–24 carbon atoms, especially 12–18 carbon atoms, preferably, dilaurylthiodipropionate and an organic peroxide curing agent. The amount of antioxidants incorporated in the elastomer can vary widely. Usually, and for economic reasons, from about 1.5–4 parts, and preferably 2–3 parts per 100 parts chlorinated polymer of each of the antioxidants thiodiethylene bis[3,5-di-t-butyl-4-hydroxy hydrocinnamate] and a dialkylthiodipropionate are incorporated in the elastomer.

DETAILED DESCRIPTION OF PREFERRED EMBODIMENTS

The chlorinated rubbery polymers chlorosulfonated polyethylene and chlorinated polyethylene are well known elastomers that are commercially available. Chlorination, that is the attachment of chlorine atoms along the polyethylene molecule in place of hydrogen atoms originally present, takes place in both processes. Chlorosulfonation is the attachment of an $-SO_2Cl$ radical to the polyethylene molecule in significant amounts in addition to the chlorine. Chlorinated and chlorosulfonated polyethylene elastomers usually contain about 25–45 weight percent chlorine and the latter have in addition from about 0.4 to 3 weight percent sulfur. Representative chlorinated and chlorosulfonated polymers are described in U.S. Pat. Nos. 2,405,971, 2,586,363 and 2,981,720.

Although the above referred to elastomers can be cured with sulfur or peroxide curing systems, sulfur cures cause discoloration of the elastomer. Prior to the present invention the physical properties of peroxide cured chlorinated elastomers were not entirely satisfactory. According to the present invention, an organic peroxide can be used as the curing agent in chlorosulfonated polyethylenes or chlorinated polyethylenes and the composition possesses stable properties due to the presence of the antioxidants and can be color coded with pigments. Generally, the amount of peroxide curing agent added to the polymer is from about 2 to 6 parts per 100 parts chlorinated polymer, usually about 3 to 5 parts per 100 parts chlorinated polymer (active ingredient). Curing temperatures for the chlorosulfonated or chlorinated polyethylene are conventional and, generally, range from about 100° to 160° C. depending on the decomposition temperature of the peroxide. Representative peroxides that function effectively as curing agents include: 2,5-dimethyl-2,5-di-(t-butylperoxy) hexyne-3; 2,5-dimethyl-2,5-di-(t-butylperoxy) hexane; di-t-butylperoxide; 2,5-di-(t-amylperoxy)-2,5-dimethyl hexane; 2,5-di(t-butylperoxy)-2,5-diphenyl hexane; 2,5-di(t-butylperoxy)-2,2,5-dicyclohexyl hexane; 2,5-di(t-butylperoxy)-2-5-dibenzylhexane; bis(alpha-methylbenzyl) peroxide, also called dicumyl peroxide; α-α-dimethylbenzyl-t-butyl peroxide; and α-α-bis-(t-butylperoxy) diisopropylbenzene. Other representative peroxide curing agents suitable for use in the present invention are disclosed in U.S. Pat. Nos. 3,012,016 and 3,079,370.

The heat resistance of the peroxide cured chlorosulfonated polyethylene and chlorinated polyethylene is greatly enhanced by the presence of the antioxidants thiodiethylene bis[3,5-di-t-butyl-4-hydroxy hydrocinnamate] and a dialkylthiodipropionate. The amount of thiodiethylene bis [3,5-di-t-butyl-4-hydroxy hydrocinnamate] incorporated in the polymer is from about 1.5 to 4 parts per 100 parts chlorinated polymer, preferably about 2 to 3 parts per 100 parts chlorinated polymer. The amount of dialkylthiodipropionate added to and incorporated in the chlorinated polymer is from about 1.5 to 4 parts per 100 parts chlorinated polymer, preferably about 2 to 3 parts per 100 parts chlorinated polymer. The dialkylthiodipropionates that are preferred for use in this invention contain 12–18 carbon atoms in the alkyl group; especially preferred compounds are distearylthiodipropionate and dilaurylthiodipropionate.

An acid acceptor is added to the chlorinated polymer composition in amounts of from about 5–40 parts per 100 parts chlorinated polymer. The acid acceptor has a stabilizing effect on the composition because any hydrochloric acid that might split out of the polymer chain is neutralized at once. Various acid acceptors known in the art can be used such as dibasic lead phthalate, lead oxide (litharge), magnesium oxide, tribasic lead maleate and mixtures thereof. Preferably, however, best results are obtained when dibasic lead phthalate is used in amounts of from about 20-30 parts per 100 parts chlorosulfonated polyethylene. When chlorinated polyethylene is being treated less acid acceptor is needed and the amount used is usually from about 5-20 parts per 100 parts chlorinated polymer.

In order to improve the plasticity and extrudability of the curable chlorinated polymer composition an ethylene/vinyl acetate copolymer or an ethylene/ethyl acrylate copolymer having about 25-50 weight percent of units derived from vinyl acetate or ethyl acrylate can be added to the composition. Generally, the polymer composition can contain from about 10-30 parts per 100 parts chlorinated polymer, preferably 15-25 parts per 100 parts chlorinated polymer of ethylene/vinyl acetate or ethylene/ethyl acrylate copolymers.

In addition to the peroxide curing agent a conventional coagent can be present in the polymer composition, generally in amounts from about 1-5 parts per 100 parts chlorinated polymer. These coagents are polyunsaturated compounds that cooperate with the peroxide curing agent to produce a more effective cure. Generally, the coagents are organic compounds containing at least one, preferably two or more, aliphatic unsaturated groups, preferably allyl or vinyl. The unsaturated groups are frequently attached to Si, O, N or P atoms. Some representative coagents that can be used include: triallyl cyanurate, diallyl maleate; diallyl terephthalate; allyl acrylate; allyl methacrylate; 2,4,6-trimethyl-2,4,6-trivinylcyclotrisiloxane; triallyl isocyanurate; diallyl acrylamide; trivinyl isocyanurate; hexaallyl phosphoramide; and triallyl phosphite.

Optionally, to improve processing characteristics of the composition, the chlorinated polymer composition can also contain up to about 15 percent by weight of the total polymer, preferably 5-10 percent by weight, of an amorphous ethylene/higher alpha-olefin copolymer rubber. Representative higher alpha-olefins that can be used to make copolymers include: propylene, 1-butene, 1-heptene, 1-decene and 1-octene. Propylene is preferred because the properties of the polymer containing propylene units are superior, and it is readily commercially available. Generally, the copolymer contains between about 40 and 80% by weight ethylene, the balance propylene, and preferably it contains up to a total of 10% by weight of olefinic hydrocarbons that are nonconjugated dienes, such as aliphatic dienes or cyclic dienes. Elastomeric copolymers of the type referred to are well known in the art and described more fully in U.S. Pat. Nos. 2,933,480 and 3,819,591.

Any pigments can be added to the chlorinated polymer compositions to impart the desired colors and the composition, when cured, will retain the selected color. Further, as illustrated in the examples that follow, the chlorinated polymer compositions exhibit excellent stability at high temperatures making them especially useful for wire and cable coverings. Generally, the amount of coloring pigments added is from about 0.8-1.8 percent by weight of the total composition. Representative pigments used in the composition include titanium dioxide, chrome yellow and iron oxide.

In addition to the ingredients listed above the curable chlorinated polymer composition can, optionally, contain conventional components such as fillers, e.g., calcined clay, silica, hydrated alumina and the like.

The following specific examples illustrate preferred embodiments of the invention. All amounts given are parts by weight unless otherwise indicated.

The ingredients listed below were mixed in an internal mixer (Banbury) at ambient temperature for about 5-8 minutes. After the ingredients were thoroughly mixed the resulting chlorinated polymer composition was cured in a press at the temperatures and times indicated below. The tensile properties were determined according to ASTM D-412.

EXAMPLES

|  | I | II | III |
|---|---|---|---|
| Chlorosulfonated Polyethylene (35 wt. % chlorine) | 90 | 100 | — |
| Chlorinated Polyethylene (35 wt. % chlorine) | — | — | 90 |
| EPDM[1] | 10 | — | 10 |
| Dibasic Lead Phthalate | 30 | 30 | 30 |
| Hydrated Alumina | 65 | 65 | 65 |
| Ethylene/Vinyl Acetate Copolymer (40 wt. % Vinyl Acetate) | 20 | 20 | 20 |
| Vinyl Silane | 1 | 1 | 1 |
| Antioxidant A[2] | 3 | 3 | 3 |
| Antioxidant B[3] | 2 | 2 | 2 |
| TAC (Triallylisocyanurate) | 2 | 2 | 2 |
| Vulcup R[4] | 3 | 3 | 3 |
| Original Physical Properties |  |  |  |
| Hardness, Durometer A | 67 | 65 | 72 |
| 300% Modulus, MPa | 10.14 | 9.73 | 9.99 |
| psi | 1471 | 1411 | 1450 |
| Ultimate Tensile, MPa | 12.48 | 11.59 | 11.20 |
| psi | 1809 | 1681 | 1625 |
| Elongation at Break, % | 430 | 410 | 360 |
| After Aging 7 Days/150° C. Oven |  |  |  |
| Hardness, Durometer A | 72 | 72 | 80 |
| Ultimate Tensile, MPa | 14.03 | 14.34 | 13.78 |
| psi | 2034 | 2079 | 2000 |
| Elongation at Break, % | 250 | 260 | 210 |
| After Aging 14 Days/150° C. Oven |  |  |  |
| Hardness, Durometer A | 75 | 76 | 80 |
| Ultimate Tensile, MPa | 12.97 | 12.26 | 11.71 |
| psi | 1880 | 1970 | 1700 |
| Elongation at Break, % | 210 | 230 | 160 |

[1] ethylene/propylene/1,4-hexadiene copolymer $ML_{(1+4)}(121°\ C.)22$
[2] thiodiethylenebis[3,5-di-t-butyl-4-hydroxy hydrocinnamate]
[3] dilaurylthiodipropionate
[4] α-α-bis-(t-butylperoxy)diisopropylbenzene The above samples made by the procedure described in the examples, did not discolor. The samples show the excellent retention of tensile strength and elongation after extended high temperature aging in air.

I claim:

1. A heat-resistant, curable chlorinated polymer composition capable of being colored which comprises a chlorinated polymer selected from the group consisting of chlorinated polyethylene or chlorosulfonated polyethylene containing from about 25-45 weight percent chlorine and having incorporated therein from about 1.5-4 parts per 100 parts chlorinated polymer of each of the antioxidants thiodiethylenebis[3,5-di-t-butyl-4-hydroxy hydrocinnamate] and a dialkylthiodipropionate of the formula:

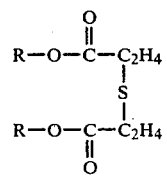

where R is an alkyl group of 6-24 carbon atoms, and an organic peroxide curing agent.

2. A curable composition of claim 1 containing from about 2-6 parts per 100 parts chlorinated polymer of an organic peroxide curing agent.

3. A curable composition of claim 1 wherein the chlorinated polymer is chlorosulfonated polyethylene.

4. A curable composition of claim 1 wherein the chlorinated polymer is chlorinated polyethylene.

5. A curable composition of claim 1 containing from about 1.5-4 parts per 100 parts chlorinated polymer of dilaurylthiodipropionate.

6. A curable composition of claim 1 containing from about 5-40 parts per 100 parts chlorinated polymer of an acid acceptor.

7. A curable composition of claim 6 wherein the acid acceptor is dibasic lead phthalate.

8. A curable composition of claim 1 wherein the chlorinated polymer contains up to about 10 percent by weight of total polymer of an amorphous ethylene, propylene, nonconjugated diene copolymer.

9. A curable composition of claim 1 containing from about 10-30 parts per 100 parts chlorinated polymer of ethylene/vinyl acetate.

10. A curable composition of claim 1 containing from about 1-5 parts per 100 parts chlorinated polymer of a coagent for the peroxide curative.

11. A curable composition of claim 1 containing coloring pigments.

12. A curable composition of claim 1 wherein the peroxide curing agent is α-α-bis-(t-butylperoxy) diisopropylbenzene.